United States Patent [19]
Ryan

[11] Patent Number: 5,701,426
[45] Date of Patent: Dec. 23, 1997

[54] DATA PROCESSING SYSTEM AND METHOD USING CACHE MISS ADDRESS PREDICTION AND FORCED LRU STATUS IN A CACHE MEMORY TO IMPROVE CACHE HIT RATIO

[75] Inventor: Charles P. Ryan, Phoenix, Ariz.

[73] Assignee: Bull Information Systems Inc., Billerica, Mass.

[21] Appl. No.: 414,602

[22] Filed: Mar. 31, 1995

[51] Int. Cl.[6] .......................... G06F 12/00; G06F 13/00
[52] U.S. Cl. .................... 395/403; 395/460; 395/464; 395/463; 395/486; 395/421.03
[58] Field of Search .................................. 395/464, 463, 395/462, 460, 485, 486, 487, 414, 403, 421.03

[56] References Cited

U.S. PATENT DOCUMENTS

| | | | |
|---|---|---|---|
| 4,853,840 | 8/1989 | Shibuya | 395/584 |
| 5,093,777 | 3/1992 | Ryan | 395/403 |
| 5,367,656 | 11/1994 | Ryan | 395/421.03 |
| 5,423,048 | 6/1995 | Jager | 395/585 |

FOREIGN PATENT DOCUMENTS

| | | |
|---|---|---|
| 0580943 | 2/1994 | European Pat. Off. . |
| 0640921 | 3/1995 | European Pat. Off. . |

Primary Examiner—Glenn Gossage
Attorney, Agent, or Firm—J. S. Solakian; J. H. Phillips

[57] ABSTRACT

A data processing system which employs a cache memory feature and a method for lowering the cache miss ratio for called operands in the data processing system are disclosed. Recent cache misses are stored in a first in, first out miss stack, and the stored addresses are searched for displacement patterns thereamong. Any detected pattern is then employed to predict a succeeding cache miss by prefetching from main memory the signal identified by the predictive address. The apparatus for performing this task is preferably hard wired for speed purposes and includes subtraction circuits for evaluating variously displaced addresses in the miss stack and comparator circuits for determining if the outputs from at least two subtraction circuits are the same indicating a pattern yielding information which can be combined with an address in the stack to develop a predictive address. The efficiency of the method and apparatus is improved by managing the priority of the block stored in cache memory such that a block received from main memory as a result of a prediction is forced to "least recently used" (LRU) status. In this manner, if the prediction has been incorrect, the incorrectly predicted block is replaced by the next block summoned from main memory rather than conventionally working its way down a priority stack before it is discarded.

2 Claims, 3 Drawing Sheets

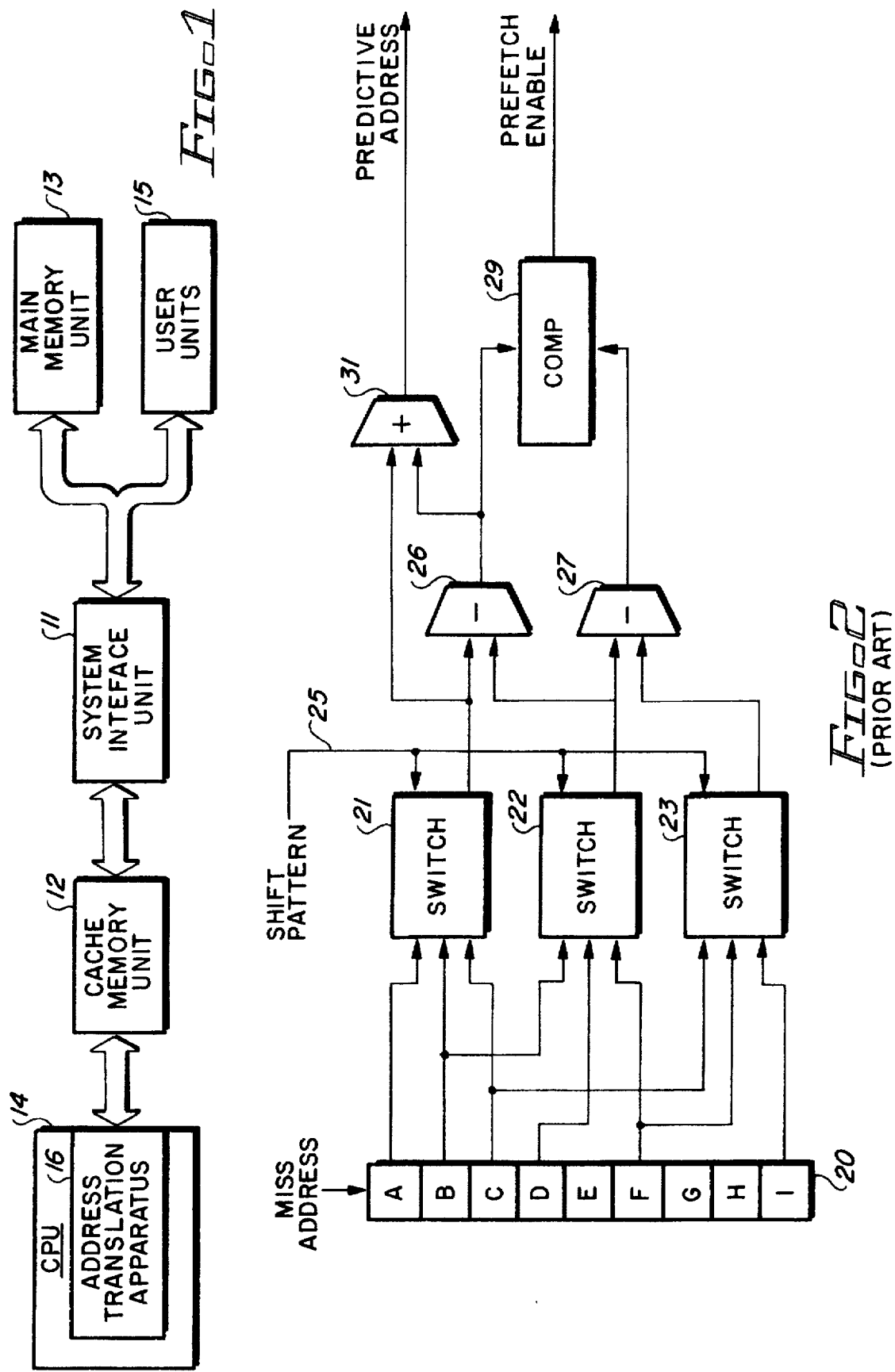

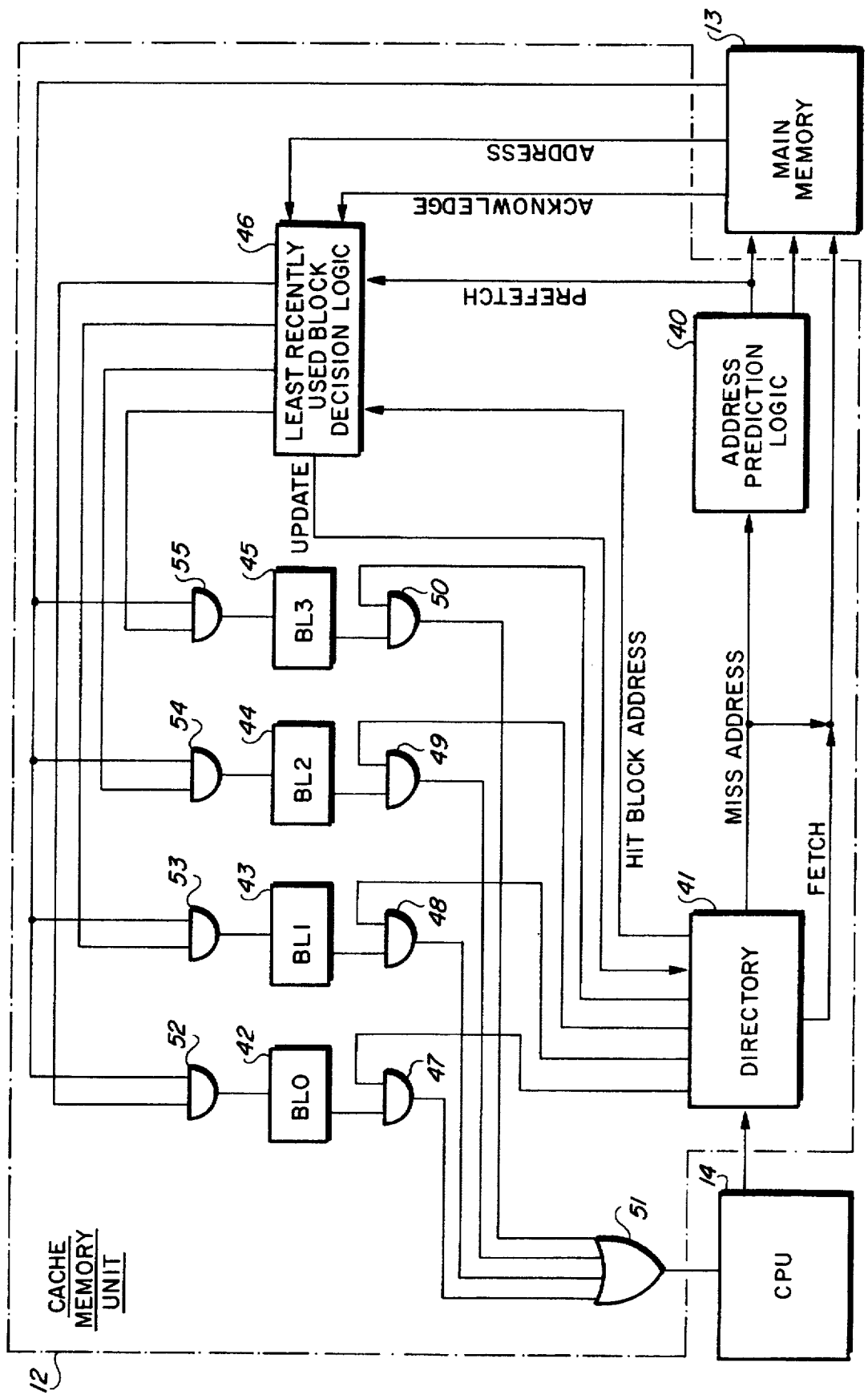

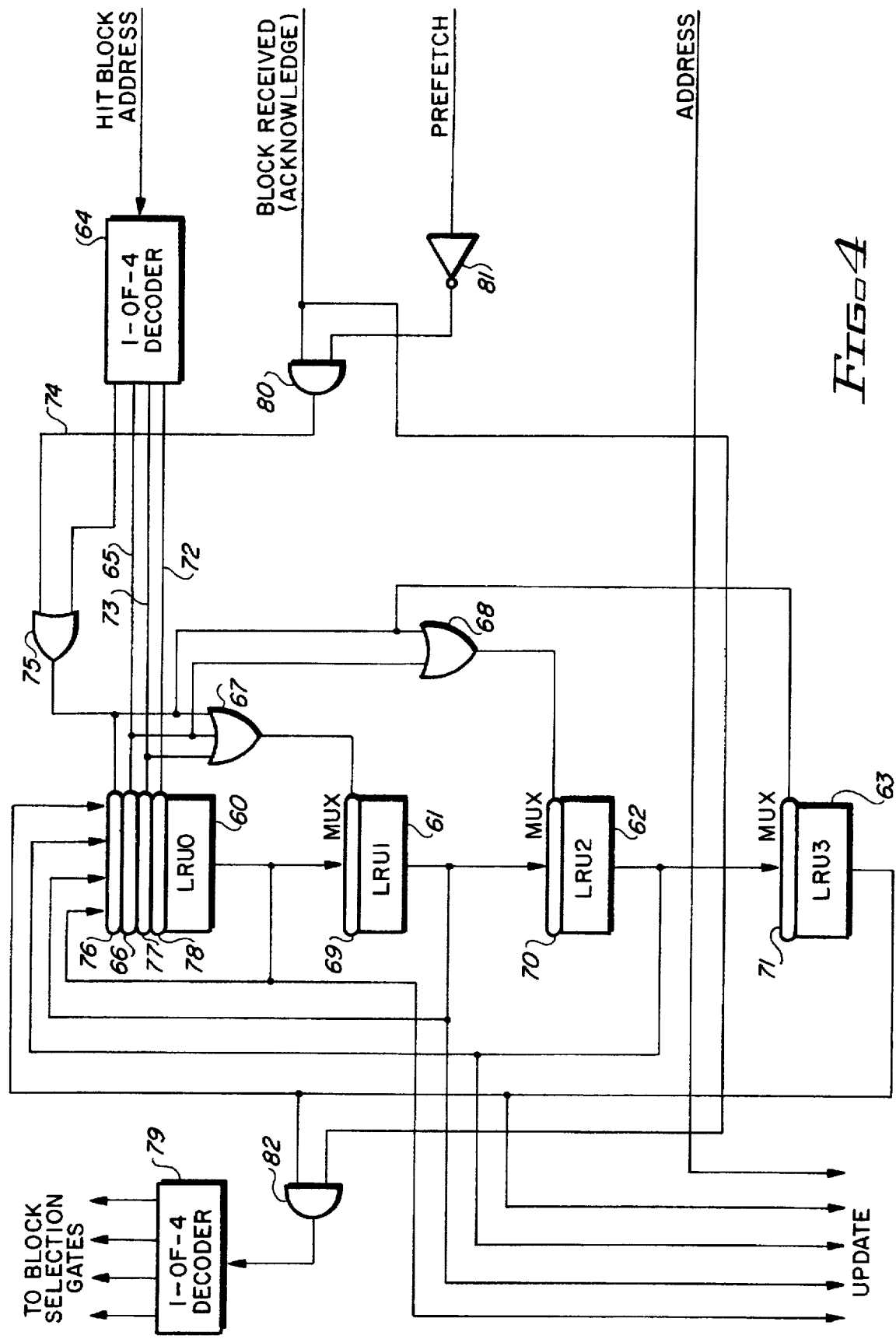

DATA PROCESSING SYSTEM AND METHOD USING CACHE MISS ADDRESS PREDICTION AND FORCED LRU STATUS IN A CACHE MEMORY TO IMPROVE CACHE HIT RATIO

FIELD OF THE INVENTION

This invention relates to data processing system central processors which include a cache memory for selectively very rapidly predicting main memory cache addresses for operand calls to the cache and then using this information to transfer data from a main memory to cache memory to thereby raise the cache hit ratio. More particularly, this invention relates to a supplementary method and apparatus in the cache memory to still further increase the cache hit ratio by selectively reordering the priority of memory blocks transiently resident in the cache.

BACKGROUND OF THE INVENTION

The technique of employing a high speed cache memory intermediate a processor and a main memory to hold a dynamic subset of the information in the main memory in order to speed up system operation is well known in the art. Briefly, the cache holds a dynamically variable collection of main memory information blocks selected and updated such that there is a good chance that the blocks transiently resident in the cache will include instructions and/or data required by the processor in upcoming operations. If there is a cache "hit" on a given operation, the information is available to the processor much faster than if main memory had to be accessed to obtain the same information. Consequently, in many high performance data processing systems, the "cache miss ratio" is one of the major limitations on the system execution rate, and it should therefore be kept as low as possible.

The key to obtaining a low cache miss ratio, perhaps better expressed as a high cache hit ratio, is obviously one of carefully selecting the information to be placed in the cache from main memory at any given instant. There are several techniques for selecting blocks of instructions for transitory residence in the cache, and the more or less linear use of instructions in programming renders these techniques statistically effective. However, the selection of operand information to be resident in cache memory at a given instant has been much less effective and has been generally limited to transferring one or more contiguous blocks including a cache miss address. This approach only slightly lowers the cache miss ratio and is also an ineffective use of cache capacity.

Thus, those skilled in the art will understand that it would be highly desirable to select operand information for transitory storage in a cache memory in such a manner as to significantly lower the cache miss ratio. That end was accomplished in accordance with the invention disclosed and claimed in U.S. patent application Ser. No. 07/364,943 filed Jun. 12, 1989, for METHOD AND APPARATUS FOR PREDICTING ADDRESS OF A SUBSEQUENT CACHE REQUEST UPON ANALYZING ADDRESS PATTERNS STORED IN SEPARATE MISS STACK by Charles P. Ryan, now U.S. Pat. No. 5,093,777, by a special purpose apparatus in the cache memory which stores recent cache misses and searches for operand patterns therein. Any detected operand pattern is then employed to anticipate a succeeding cache miss by prefetching from main memory the block containing the predicted cache miss.

Inventions which address other improvements to the invention disclosed and claimed in U.S. Pat. No. 5,093,777 include those disclosed and claimed in:

U.S. patent application Ser. No. 07/841,687 filed Feb. 26, 1992, for CONTROLLABLY OPERABLE METHOD AND APPARATUS FOR PREDICTING ADDRESSES OF FUTURE OPERAND REQUESTS BY EXAMINATION OF ADDRESSES OF PRIOR CACHE MISSES (as amended) by Charles P. Ryan.

U.S. patent application Ser. No. 07/850,713 filed Mar. 13, 1992, for CONTROLLING CACHE PREDICTIVE PREFETCHING BASED ON CACHE HIT RATIO TREND (as amended) by Charles P. Ryan, now U.S. Pat. No. 5,367,656.

U.S. patent application Ser. No. 07/906,618 filed Jun. 30, 1992, for PATTERN SEARCH OPTIMIZER FOR CACHE MISS PREDICTION METHOD AND APPARATUS by Charles P. Ryan, now U.S. Pat. No. 5,495,591.

U.S. patent application Ser. No. 07/921,825 filed Jul. 29, 1992, for CACHE MISS PREDICTION METHOD AND APPARATUS FOR USE WITH PAGED MAIN MEMORY IN A DATA PROCESSING SYSTEM by Charles P. Ryan, now U.S. Pat. No. 5,450,561.

U.S. patent application Ser. No. 08/111,351 filed Aug. 24, 1993, for CACHE MISS PREDICTION APPARATUS WITH PRIORITY ENCODER FOR MULTIPLE PREDICTION MATCHES AND METHOD THEREFOR (as amended) by Charles P. Ryan, now U.S. Pat. No. 5,426,764.

All the foregoing United States Patents are of interest inasmuch as the present invention achieves improved performance with all versions of the is operand address prediction method and apparatus.

OBJECTS OF THE INVENTION

It is therefore a broad object of this invention to provide an improved cache memory in a data processing system.

It is another object of this invention to provide a cache memory particularly characterized by exhibiting a higher cache hit ratio in operation when operand blocks are being requested by a CPU.

It is a more specific object of this invention to provide a cache memory incorporating operand address prediction apparatus which makes cache miss predictions very quickly.

It is a still more specific object of this invention to provide an operand address prediction method and apparatus which includes a supplementary method and apparatus for selectively reordering the priority of memory blocks transiently resident in the cache memory in order to still further improve the cache hit ratio.

SUMMARY OF THE INVENTION

Briefly, these and other objects of the invention are achieved by a special purpose apparatus which stores recent cache misses and searches for address patterns therein. Any detected pattern is then employed to anticipate a succeeding cache miss by prefetching from main memory the block containing the predicted cache miss. The efficiency of the method and apparatus is improved by managing the priority of the blocks stored in cache memory such that a block received from main memory as a result of a prediction is forced to a "least recently used" status. In that manner, if the prediction has been incorrect, that incorrectly predicted block is replaced by the next block summoned from main memory rather than conventionally working its way down a priority stack before it is discarded.

BRIEF DESCRIPTION OF THE DRAWINGS

The subject matter of the invention is particularly pointed out and distinctly claimed in the concluding portion of the

3 specification. The invention, however, both as to organization and method of operation, may best be understood by reference to the following description taken in conjunction with the subjoined claims and the accompanying drawings of which:

FIG. 1 is a generalized block diagram of a typical data processing system employing a cache memory and therefore constituting an exemplary environment for practicing the invention;

FIG. 2 is a logic diagram of a simple exemplary embodiment of the cache miss prediction apparatus disclosed and claimed in U.S. Pat. No. 5,093,777;

FIG. 3 is a block diagram of a cache memory unit incorporating the present invention; and FIG. 4 is a more detailed block diagram of the LRU block decision logic found in FIG. 4.

DETAILED DESCRIPTION OF THE PREFERRED EMBODIMENT

Referring now to FIG. 1, there is shown a high level block diagram for a data processing system incorporating a cache memory. Those skilled in the art will appreciate that this block diagram is only exemplary and that many variations on it are employed in practice. Its function is merely to provide a context for discussing the subject invention. Thus, the illustrative data processing system includes a main memory unit 13 which stores the data signal groups (i.e., information words, including instructions and operands) required by a central processing unit ("CPU") 14 to execute the desired procedures. Signal groups (or "blocks") with an enhanced probability for requirement by the CPU 14 in the near term are transferred from the main memory unit 13 (or one of the user units 15) through a system interface unit 11 to a cache memory unit 12. Those skilled in the art will understand that, in some data processing system architectures, the signal blocks are transferred over a system bus, thereby requiring an interface unit for each component interacting with the system bus.) The blocks are stored in the cache 12 until requested by the CPU 14. To retrieve the correct signal group or block, address translation apparatus 16 is typically incorporated to convert a virtual address (used by the CPU 14 to identify the signal group to be fetched) to the real address used for that signal group by the remainder of the data processing system to identify the signal group.

The information stored transiently in the cache memory unit 14 may include both instructions and operands stored in separate sections or stored homogeneously. Preferably, in the practice of the present invention, instructions and operands are stored in separate (at least in the sense that they do not have commingled addresses) memory sections in the cache memory unit 14 inasmuch as it is intended to invoke the operation of the present invention as to operand information only.

The cache miss address prediction mechanism which is an aspect of the invention is based on recognizing and taking advantage of sensed patterns in cache misses resulting from operand calls. In an extremely elementary example, consider a sensed pattern in which three consecutive misses ABC are, in fact, successive operand addresses with D being the next successive address. This might take place, merely by way of example, in a data manipulation process calling for successively accessing successive rows in a single column of data. If this pattern is sensed, the likelihood that signal group D will also be accessed, and soon, is enhanced such that its prefetching into the cache memory unit 14 is in order.

4

First discussing the exemplary prior art address prediction logic disclosed and claimed in U.S. Pat. No. 5,093,777, consider the relatively simple hardwired implementation as shown in FIG. 2. A miss stack 20 holds the nine most recent cache miss addresses, the oldest being identified as address I with entry onto the stack being made at the top. Three quad-input electronic switches 21, 22, 23 are driven in concert by a shift pattern signal via line 25 such that: in a first state, addresses A, B, C appear at the respective outputs of the switches; in a second state, addresses B, D, F appear at the outputs; in a third state, addresses G, F, I appear at the outputs; and in a fourth state, addresses D, H, L appear at the outputs. Subtraction circuits 26, 27 are connected to receive as inputs the respective outputs of the electronic switches 21, 22, 23 such that: the output from the subtraction circuit 26 is the output of the switch 21 minus the output of the switch 22 and the output from the subtraction circuit 27 is the Output of the switch 22 minus the output of the switch 23.

The output from the subtraction circuit 26 is applied to one input of an adder circuit 31 which has its other input driven by the output of the electronic switch 21. In addition, the output from the subtraction circuit 26 is also applied to one input of a comparator circuit 29. The output from the subtraction circuit 27 is applied to the other input of the comparator circuit 29. The output from the comparator circuit 29 selectively issues a prefetch enable signal.

Consider now the operation of the circuit shown in FIG. 2. As previously noted, miss stack 20 holds the last nine cache miss addresses, address A being the most recent. When the request for the memory block identified by address A results in a cache miss, circuit operation is instituted to search for a pattern among the addresses resident in the miss stack. Assume that the electronic switches 21, 22, 23 are at their first state such that address A is passed through to the output of switch 21, address B appears at the output of switch 22 and address C appears at the output of switch 23. If the differences between A and B and B and C are not equal, the outputs from the subtraction circuits 26, 27 will not be equal such that the comparator circuit 29 will not issue a prefetch enable signal because no pattern from which a predictive address can be calculated has been sensed.

The switches 21, 22, 23 are then advanced to their second state in which addresses B, D, F appear at their respective outputs. Assume now that (B−D)=(D−F); i.e., a sequential pattern has been sensed in the address displacements. Consequently, the difference signals issued by the subtraction circuits 26, 27 will be equal such that the comparator 29 will produce a prefetch enable signal. Simultaneously, the output from the adder circuit 31 will be the predictive address (B+(B−D)). The signal block stored at that address in main memory will therefore be called into the cache unit 12. It will be seen that this predictive address extends the sensed pattern and thus increases the probability that the prefetched signal block will be requested by the processor, thereby increasing the cache hit ratio.

If a pattern had not have been sensed in the address combination BDF, the electronic switches 21, 22, 23 would have been advanced to their next state to examine the address combination CFI. If no pattern was sensed, the circuit will await the next cache miss which will place a new entry at the top of the miss stack 20 and push address I out the bottom of the stack before the pattern match search process is again instituted.

The foregoing discussion relates to a relatively simple embodiment of the invention disclosed and claimed in the above-referenced U.S. Pat. No. 5,093,777. A more complete exposition of various embodiments of the address prediction logic per se may be obtained therein or in any of the other United States patents identified above. However, for a complete understanding of the present invention, the preceding description of the FIG. 2 elementary embodiment of the address prediction logic suffices.

It is conventional practice in cache memory technology to keep track of which block currently resident in the cache is the "least recently used" or LRU. This is for the purpose of determining which block will be flushed out of the cache when some event, such as a cache miss, results in a new information block being brought in from main memory. Typically, LRU determination apparatus includes a first in, first out (FIFO) stack and the necessary adjunct logic for placing the block address of a new information block onto the top of the stack and also to place the block address of an already resident block which has been the subject of a cache hit onto the top of the stack. Thus, the block address of a resident block which is not hit will work down to the bottom of the stack such that the corresponding block will be flushed out of the cache when a new block is called in from main memory.

Since the operand address prediction mechanisms described and claimed in the above-identified United States patents and patent applications result in a new block of information being speculatively drawn from main memory into the cache, the identification of that block will routinely be placed at the top of the LRU stack. However, if the speculative block turns out to be a failure because there is no immediate hit, then the block space still remains occupied until the block identification works its way to the bottom of the stack. Consequently, the effectiveness of the cache is diminished because one of the blocks apparently will not be hit in the near term. It is to the solution of this problem that the present invention is addressed.

FIG. 3 illustrates a cache memory unit 12 which incorporates address prediction logic 40 which may be any of the embodiments disclosed in the above referenced United States patents and patent applications and may, for convenience in understanding the apparatus shown in FIG. 3, be the elementary version shown in FIG. 2 hereof.

When the CPU 14 issues a memory request to the cache unit 12, the address of the requested information is sent to a directory 41 which keeps track of which memory blocks are currently resident in the cache. In the simplified exemplary embodiment of a cache unit shown in FIG. 3, four memory storage blocks 42, 43, 44, 45 are provided for cache memory storage. If the directory determines that the requested information is resident in the cache, it will issue a signal to enable the appropriate one of AND-gates 47, 48, 49, 50 in order that the requested information may be sent from the identified one of the memory blocks 42, 43, 44, 45 through OR-gate 51 and to the requesting CPU 14. In addition, a hit block address is sent to least-recently-used-block-decision-logic ("LRU logic") block 46 to change the priority of the just accessed memory block as will be described more fully below.

On the other hand, if the directory 41 determines that the memory block requested by the CPU 14 is not currently resident in the cache unit 12, it issues a fetch signal and the appropriate address to the main memory 13 to summon the requested information into the cache unit. The LRU logic block 46 is alerted to this action. The main memory 13 responds by sending the requested memory block to the cache unit 12 where it is steered to the least recently used memory block storage 42, 43, 44, 45 as determined by the LRU logic block 46 and controlled by enabling the appropriate one of the AND-gates 52, 53, 54, 55. Address and acknowledgment information about the newly received memory block is also sent to the LRU logic block 46 which sends update information to the directory 41 indicating that the new memory block is now resident and that one of the previously resident memory blocks has been accordingly flushed.

Those skilled in the art will recognize that the foregoing description is typical of conventional cache memory operation except for the incorporation of the address prediction logic 40. As previously described with respect to the latter, if the directory 41 determines that a memory request from the CPU 14 results in a cache miss condition, the miss address is sent to the address prediction logic 40 which searches for a pattern among recent cache misses and, if one is found, prefetches a predicted memory block into cache memory.

Attention is now directed to FIG. 4 which is a simplified logic diagram of the LRU logic block 46 shown in FIG. 3. Since there are four memory storage blocks in the exemplary cache memory unit, the LRU logic includes an LRU stack having four stages 60, 61, 62, 63, each of which, at any given time, stores a two-bit address of a unique one of the four memory blocks. In the example, the LRU stack is configured as a recirculating, push down stack although other configurations may be used. Thus, during operation, the cache address of the least recently used memory block will reside in LRU3 63.

It will be noted that four inputs may be selected at LRU0 60, and that the four inputs are the respective outputs from LRU stack stages LRU0 60, LRU1 61, LRU2 62, LRU3 63. However, at the other three stages of the LRU stack, the sole input is from the previous stage; e.g., the LRU1 61 output is applied to LRU2 62 input under control of multiplexer 70.

Several examples under different conditions will illustrate the normal operation of the LRU logic. Assume first that the LRU stack stages at a given instant hold the following memory block addresses:

LRU0 "11"
LRU1 "01"
LRU2 "10"
LRU3 "00"

Assume next (and also referring to FIG. 3 as necessary) that the CPU 14 has requested information which the directory 41 determines is stored in BL2 44. Under these conditions, there is a cache hit, and the target information is known to be stored in the memory block whose cache address "10" is resident in LRU2 62. The directory 41 sends a hit block address signal to the LRU logic block, the hit block address being, in effect, the address of LRU2 62. The hit block address is applied to 1-of-4 decoder 64 which has four outputs, one of which will be enabled according to the hit block address received. In the present example, line 65 will be enabled to activate input multiplexer stage 66 which provides input to LRU0 60 from LRU2 62. In addition, the signal on line 65 is applied to inputs to OR-gates 67, 68 which respectively activate multiplexers 69, 70 which provide respective inputs to LRU1 61 and LRU2 62 from LRU0 60 and LRU1 61.

Continuing with the example, the appearance of a signal on line 65 steered to multiplexer stage 66 and multiplexers 69, 70 results in: the transfer of the contents of LRU2 62 into LRU0 60, the transfer of the contents of LRU0 60 into LRU1 61 and the transfer of the contents of LRU1 61 into LRU2

62. The effect is that the address "10" is moved to the top of the LRU stack. LRU0 60, as the cache address of the most recently used memory block and that the cache addresses previously stored in LRU0 and LRU 1 are pushed down into LRU 1 and LRU2, respectively, while the cache address stored in LRU3 has not been disturbed. Thus, the new order of information stored in the LRU stack is as follows:

LRU0 "10"
LRU1 "11"
LRU2 "01"
LRU3 "00"

As a second example, assume that there has been a cache hit and that the address of the identified memory block is "00" which resides in LRU3 63. In this instance, the hit block address signal will enable line 74 which, through an OR-gate 75, activates multiplexer stage 76 and multiplexers 69, 70, 71 such that the contents previously held in LRU3 63 are transferred to the top of the stack, LRU0 60, and the contents of LRU0, LRU1, LRU2 are pushed down. Now, the order of cache addresses stored in the LRU stack is as follows:

LRU0 "00"
LRU1 "10"
LRU2 "11"
LRU3 "01"

Therefore, the memory block stored at location "01" has been "demoted" and is now identified as the "least recently used". Similar activities take place when lines 72 and 73 are enabled as a result of a hit block address being received by the 1-of-4 decoder 64. In each case, the address of the hit block is pulled out of position and moved to the top of the LRU stack, and push down activity takes place as appropriate.

Consider now a next succeeding example in which there has occurred a cache miss such that the directory 41 has issued a "fetch" signal and address to the main memory 13. As a result, a new memory block will arrive from main memory along with a "block received" acknowledgment signal. The "block received" signal is applied to one input of an AND-gate 80 whose other input is normally enabled by the output from an inverter 81; i.e., normally enabled as long as the "prefetch signal", which drives the inverter 81, is not present.

The "block received" signal is applied to enable AND-gate 82 to apply the cache address resident in LRU3 63, i.e., the cache address "01" of the least recently used cache memory block, to a 1-of-4 decoder 79. One-of-four (1 of 4) decoder 79 will therefore issue on the appropriate one of its outputs a signal to steer the block of information just received from main memory through AND-gate 53 (FIG. 3) and into BL1 43, replacing the previous contents which are flushed.

In addition, the output from AND-gate 80 is applied as an input to OR-gate 75 which enables the multiplexer stage 76, multiplexer 69 (through OR-gate 67), multiplexer 70 (through OR-gate 68) and multiplexer 71. Thus, the LRU stack circulates, and the most recently used block address, now "01", is resident in LRU0 60. The order of cache addresses stored in the LRU stack is thereupon as follows:

LRU0 "01"
LRU1 "00"
LRU2 "10"
LRU3 "11"

As a final example, consider that, as a result of the cache miss, the address prediction logic 40 has found a pattern and generated a predictive address and a "prefetch" signal. The main memory will respond as described immediately above for the previous example; by sending the requested memory block and the acknowledgment and address information to the cache unit. However, a significant difference in operation of the LRU logic block ensues. The "block received signal" still serves to direct the cache address stored in LRU3 63 to the 1-of-4 decoder 79 to identify the least recently used block which will receive the memory block just received from main memory. But, the presence of the "prefetch" signal operates to disable the AND-gate 80. As a consequence, no circulation of the LRU stack takes place, and the cache memory block which has just received the most recent information block from main memory is forced to assume the least recently used status rather than being placed into the most recently used status. The result is that if there is a cache miss upon the next request from the CPU, it is the incorrectly predicted memory block which is immediately discarded rather than a block which may have a better chance of subsequently being requested. If, on the other hand, before a cache miss is encountered, there is a hit on the predicted memory block, then it will be moved to the top of the stack as previously described. In this manner, cache memory space is not unduly tied up by an operand address prediction which turns out to be incorrect.

Those skilled in the art will understand that the logic circuitry of FIGS. 2, 3 and 4 is somewhat simplified since multiple binary digit information is presented as if it were single binary digit information. In practice, arrays of electronic switches, gates, etc. will actually be employed to handle the added dimension as may be necessary. Further, timing signals and logic for incorporating the invention into a given data processing system environment will be those appropriate for that environment and may be the subject of straightforward logic design. For example, it is more usual to update all directory and LRU logic at directory allocation time rather than later as shown in the example, but the logic is more complex and there is no difference in the principle of operation.

Thus, while the principles of the invention have now been made clear in an illustrative embodiment, there will be immediately obvious to those skilled in the art many modifications of the structure, arrangements, proportions, elements, materials, and components, used in the practice of the invention which may be particularly adapted for specific environments and operating requirements without departing from those principles.

What is claimed is:

1. In a data processing system incorporating a processor running successive processes, a main memory for storing signal blocks, a cache memory for storing a plurality of blocks of information therein at a corresponding plurality of addresses and for supplying an information word group to said processor in response to a request from said processor supplying a word group address for said information word group, a first in, first out miss stack for storing a plurality of operand cache miss addresses and a least-recently-used stack for tracking the sequence of use of said plurality of blocks of information stored in said cache memory and for providing an ongoing indication of the least-recently-used block of information, a method comprising:

A) waiting for an occurrence of an operand cache miss resulting from an absence, in said cache memory, of called information requested from said cache memory by said processor, the called information having an address;

B) when an operand cache miss condition occurs, placing the address of the called information into said first in, first out miss stack;

C) examining said first in, first out miss stack for an address pattern among lower order potions of operand cache miss addresses resident therein;

D) if a pattern is not matched in step C), returning to step A); and

E) if a pattern is matched in step C):
  1) using the matched pattern and at least one of the operand cache miss addresses stored in said first in, first out miss stack to calculate a predictive address identifying one of the signal blocks stored in said main memory;
  2) prefetching into said cache memory from said main memory the block of information identified by the predictive address;
  3) placing the prefetched block of information into said cache memory as the one of the blocks of information identified by said least-recently-used stack as the least recently used;
  4) forcing said least-recently-used stack to continue to identify the block of information identified in step E)3) as the least recently used; and
  5) returning to step A).

2. A data processing system including a processor for running successive processes; a cache memory including a plurality of cache memory blocks having a corresponding plurality of cache addresses; a main memory for storing memory blocks; and an operand cache miss prediction mechanism for prefetching memory blocks, each identified by an address, from said main memory into said cache memory in response to the coordinated presence of a predictive address and a prefetch enable signal, which operand cache miss prediction mechanism comprises: a directory adapted to fetch a memory block requested by said processor, but not resident in said cache memory, into said cache memory; a first in, first out stack for storing a plurality of addresses representing operand cache misses; a plurality of electronic switches each having a plurality of address inputs and a single address output; coupling means for coupling predetermined ones of said plurality of addresses stored in said first in, first out stack individually to the address inputs of said electronic switches in predetermined combinations; shift pattern means for switching said plurality of electronic switches to transfer a plurality of selected addresses from said plurality of switch inputs to said plurality of switch outputs to establish at said electronic switch outputs predetermined combinations of said plurality of addresses coupled to said plurality of electronic switch inputs; at least one pair of subtraction circuits, each subtraction circuit being coupled to receive a unique pair of addresses from said electronic switch outputs and issue a displacement value representing the difference therebetween; at least one comparator circuit coupled to receive a pair of outputs from a corresponding pair of said subtraction circuits and responsive thereto for issuing the prefetch enable signal if there is a match condition; an adder circuit for summing one of the addresses appearing at one of said electronic switch outputs and the displacement value issued by one of said subtraction circuits to obtain the predictive address, wherein, in response to the coordinated presence of the prefetch enable signal and the predictive address, the memory block in said main memory identified by the predictive address is prefetched into said cache memory; and a least-recently-used stack for tracking the sequence of use of said plurality of cache memory blocks and for providing an ongoing indication of the least-recently used cache memory block, said least-recently-used stack including a first stage for storing the cache address of the most recently used one of the cache memory blocks and a second stage for storing the cache address of the least recently used one of the cache memory blocks, wherein said operand cache miss prediction mechanism is operative to:

(A) direct the placement of a memory block called from said main memory into said cache memory by said directory into the memory block identified by said second stage of said least-recently-used stack as least recently used and transfer the cache address thereof to said first stage to indicate most recently used status; and (B) direct the placement of a memory block called from said main memory into said cache memory by said operand cache miss prediction mechanism into the memory block identified by said second stage of said least-recently-used stack as least recently used and inhibit the transfer of the cache address thereof to said first stage to thereby force least recently used status thereon.

* * * * *